United States Patent
Ambo et al.

(10) Patent No.: US 10,544,805 B2
(45) Date of Patent: Jan. 28, 2020

(54) ON-VEHICLE MOTOR-DRIVEN COMPRESSOR

(71) Applicant: KABUSHIKI KAISHA TOYOTA JIDOSHOKKI, Kariya-shi, Aichi-ken (JP)

(72) Inventors: Shunsuke Ambo, Kariya (JP); Fumihiro Kagawa, Kariya (JP); Yoshiki Nagata, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/365,982

(22) Filed: Mar. 27, 2019

(65) Prior Publication Data
US 2019/0301490 A1 Oct. 3, 2019

(30) Foreign Application Priority Data
Mar. 30, 2018 (JP) ................................. 2018-070078

(51) Int. Cl.
| | |
|---|---|
| F04D 29/60 | (2006.01) |
| F04D 29/42 | (2006.01) |
| B60H 1/00 | (2006.01) |
| F04B 39/12 | (2006.01) |
| B60H 1/32 | (2006.01) |

(52) U.S. Cl.
CPC ....... F04D 29/601 (2013.01); B60H 1/00521 (2013.01); F04B 39/121 (2013.01); F04D 29/4206 (2013.01); B60H 1/3229 (2013.01)

(58) Field of Classification Search
CPC . B60H 1/00521; B60H 1/3229; F04D 29/601; F04D 29/4206; F04B 39/121
See application file for complete search history.

(56) References Cited

U.S. PATENT DOCUMENTS

| | | | | |
|---|---|---|---|---|
| 10,003,241 | B2 * | 6/2018 | Naito | .................... H02M 3/155 |
| 2013/0049918 | A1 * | 2/2013 | Fu | ............................. H01F 3/12 336/220 |
| 2014/0097928 | A1 * | 4/2014 | Tomonari | ................ H01F 27/28 336/207 |
| 2014/0306788 | A1 * | 10/2014 | Umetani | ............... H01F 27/385 336/173 |

FOREIGN PATENT DOCUMENTS

WO 2017/170817 A1 10/2017

* cited by examiner

*Primary Examiner* — Emily P Pham
(74) *Attorney, Agent, or Firm* — Sughrue Mion, PLLC

(57) ABSTRACT

An on-vehicle motor-driven compressor includes a compression unit, an electric motor, and an inverter device. The inverter device includes an inverter circuit and a noise reducer. The noise reducer includes a common-mode choke coil and a smoothing capacitor. The common-mode choke coil includes a case, a loop-shaped core accommodated in the case, a first winding and a second winding that are wound around the case, and a loop-shaped conductor that covers the core and the case. Parts of the conductor that are opposed to each other between the first winding and the second winding are spaced apart from each other. The case includes two projections that project from an outer surface of the case. The conductor is held by the two projections such that the conductor is spaced apart from the first winding and the second winding.

3 Claims, 7 Drawing Sheets

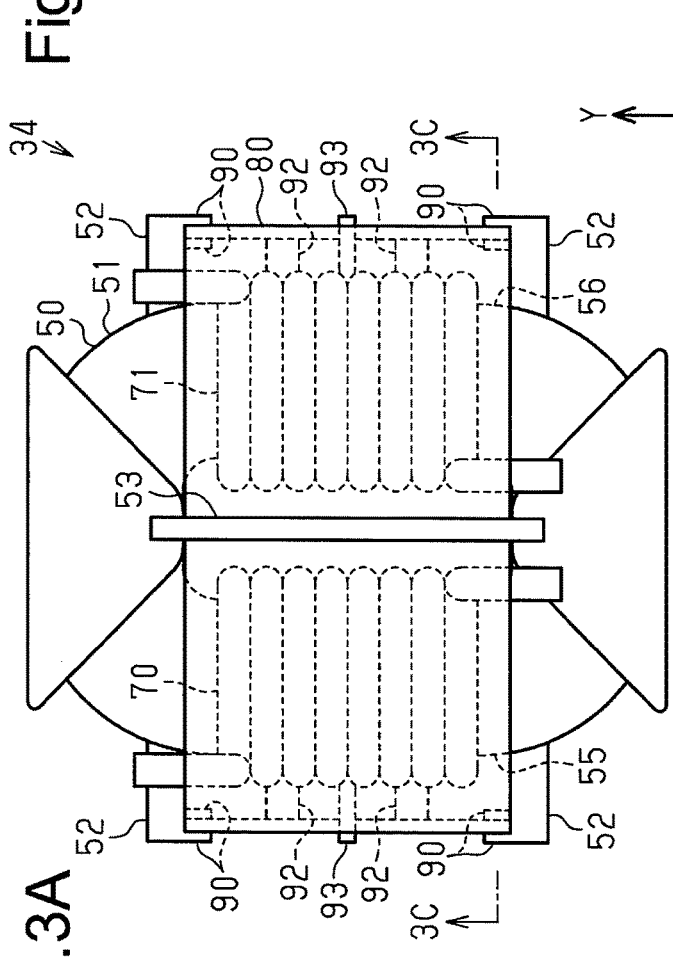
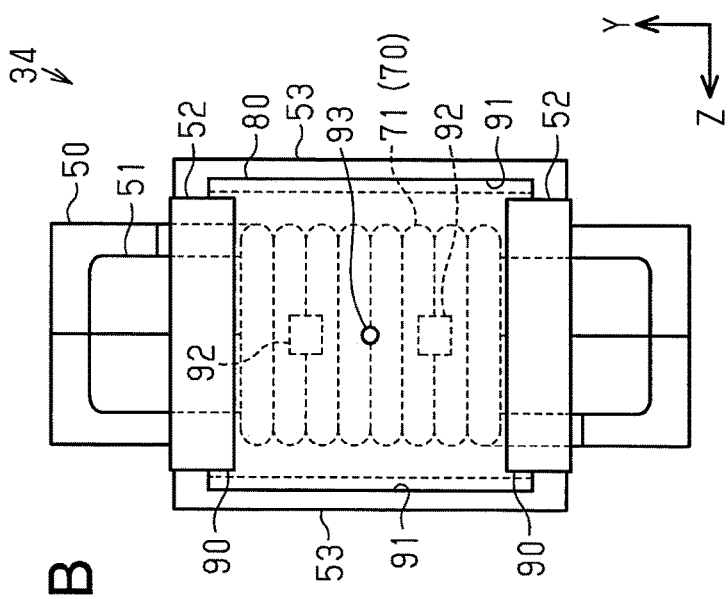
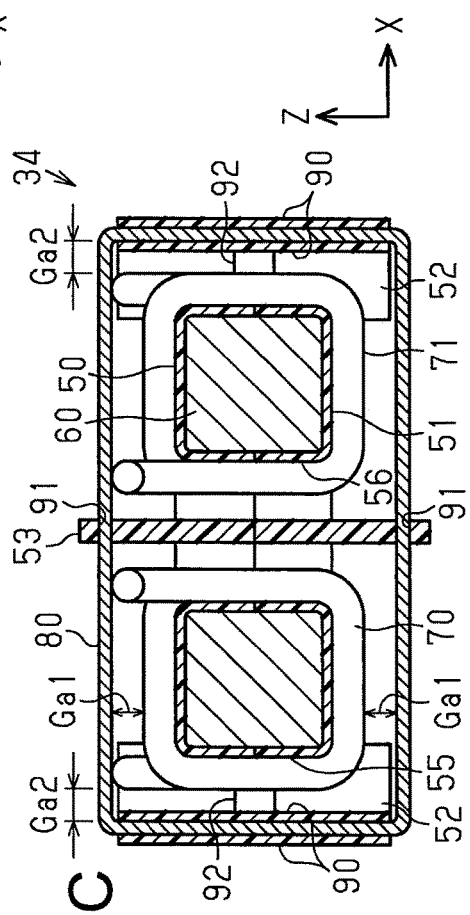

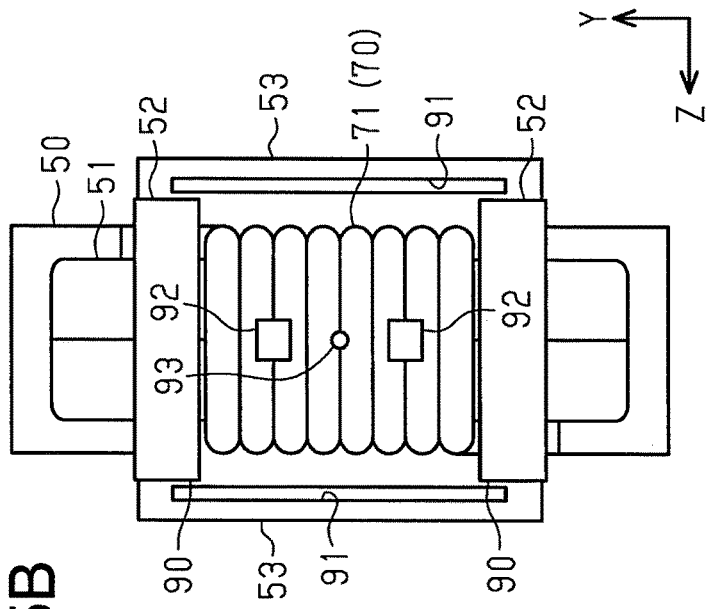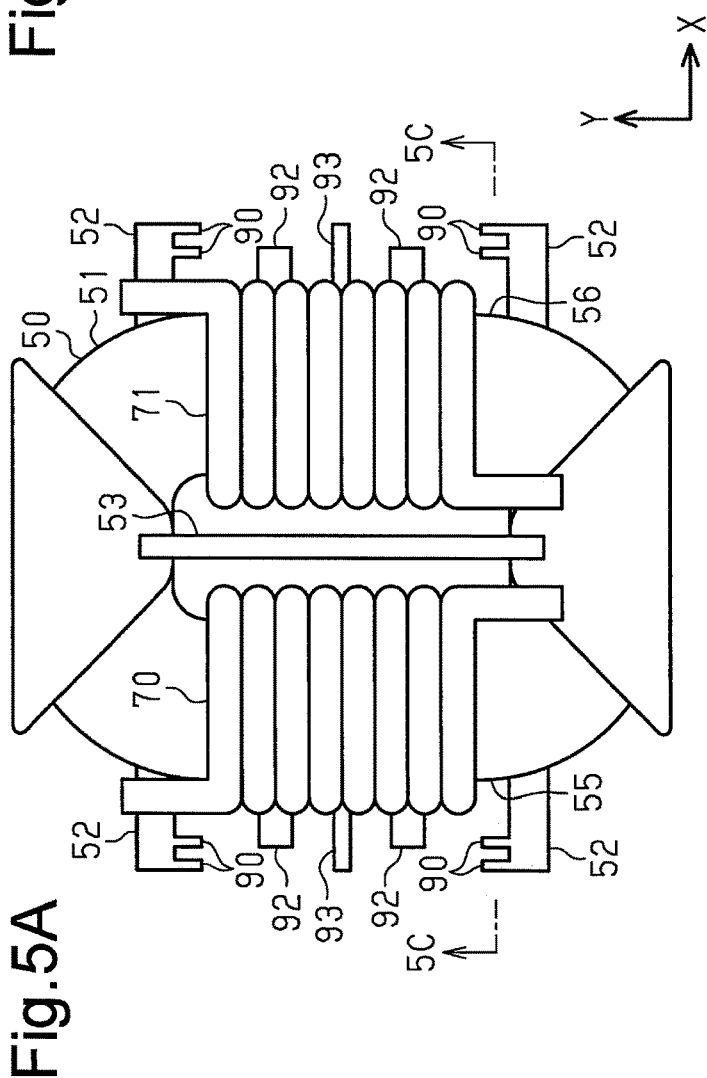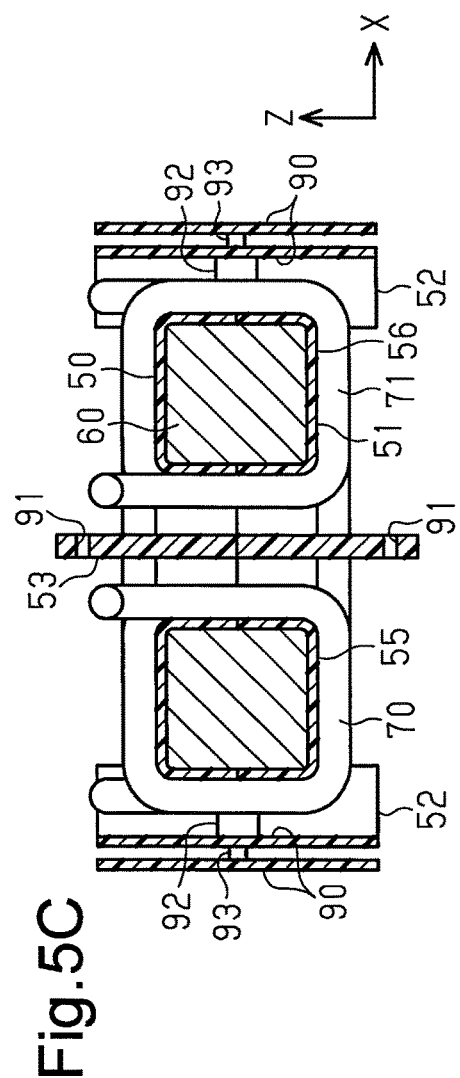

ON-VEHICLE MOTOR-DRIVEN COMPRESSOR

BACKGROUND

The present disclosure relates to an on-vehicle motor-driven compressor.

International Patent Publication WO2017/170817 discloses one example of the configuration of a common-mode choke coil used for an inverter device that drives an electric motor in an on-vehicle motor-driven compressor. The entire choke coil of the publication is shielded.

When entirely shielded, the choke coil may tend to be filled with heat and become difficult to manufacture. To solve this problem, a structure covered with a loop-shaped conductor can be employed. That is, current generated from leakage magnetic fluxes is converted into heat in a plate-shaped conductor. A clearance having a certain size needs to be set between a belt-shaped metal plate and windings while ensuring insulation over the entire belt-shaped metal plate and the entire windings.

SUMMARY

It is an object of the present disclosure to provide an on-vehicle motor-driven compressor that stabilizes the characteristics of a filter circuit.

An on-vehicle motor-driven compressor according to one aspect includes a compression unit configured to compress fluid, an electric motor configured to drive the compression unit, and an inverter device configured to drive the electric motor. The inverter device includes an inverter circuit configured to convert direct-current power into alternating-current power and a noise reducer arranged on an input side of the inverter circuit. The noise reducer is configured to reduce common-mode noise and normal-mode noise contained in the direct-current power before being input to the inverter circuit. The noise reducer includes a common-mode choke coil and a smoothing capacitor. The common-mode choke coil and the smoothing capacitor configure a low-pass filter circuit. The common-mode choke coil includes a loop-shaped case made of a plastic, a loop-shaped core accommodated in the case, a first winding wound around an outer surface of the case, a second winding wound around the outer surface of the case, the second winding being spaced apart from and opposed to the first winding, and a loop-shaped conductor that covers the core and the case while extending over the first winding and the second winding. Parts of the conductor that are opposed to each other between the first winding and the second winding are spaced apart from each other. The case includes two projections that project from the outer surface of the case. The conductor is held by the two projections such that the conductor is spaced apart from the first winding and the second winding.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure may be understood by reference to the following description together with the accompanying drawings in which:

FIG. 3A is a plan view of a common-mode choke coil;

FIG. 3B is a right side view of the common-mode choke coil;

FIG. 3C is a cross-sectional view taken along line 3C-3C in FIG. 3A;

FIG. 5A is a plan view of a case, a core, and windings;

FIG. 5B is a right side view of the case, the core, and the windings;

FIG. 5C is a cross-sectional view taken along line 5C-5C in FIG. 5A;

DETAILED DESCRIPTION

An embodiment will now be described with reference to the drawings. An on-vehicle motor-driven compressor 11 of the first embodiment includes a compression unit 18 that compresses refrigerant serving as fluid and is used with, for example, an on-vehicle vehicle air conditioner. That is, the fluid to be compressed in the on-vehicle motor-driven compressor in the first embodiment is refrigerant.

Figure 1:
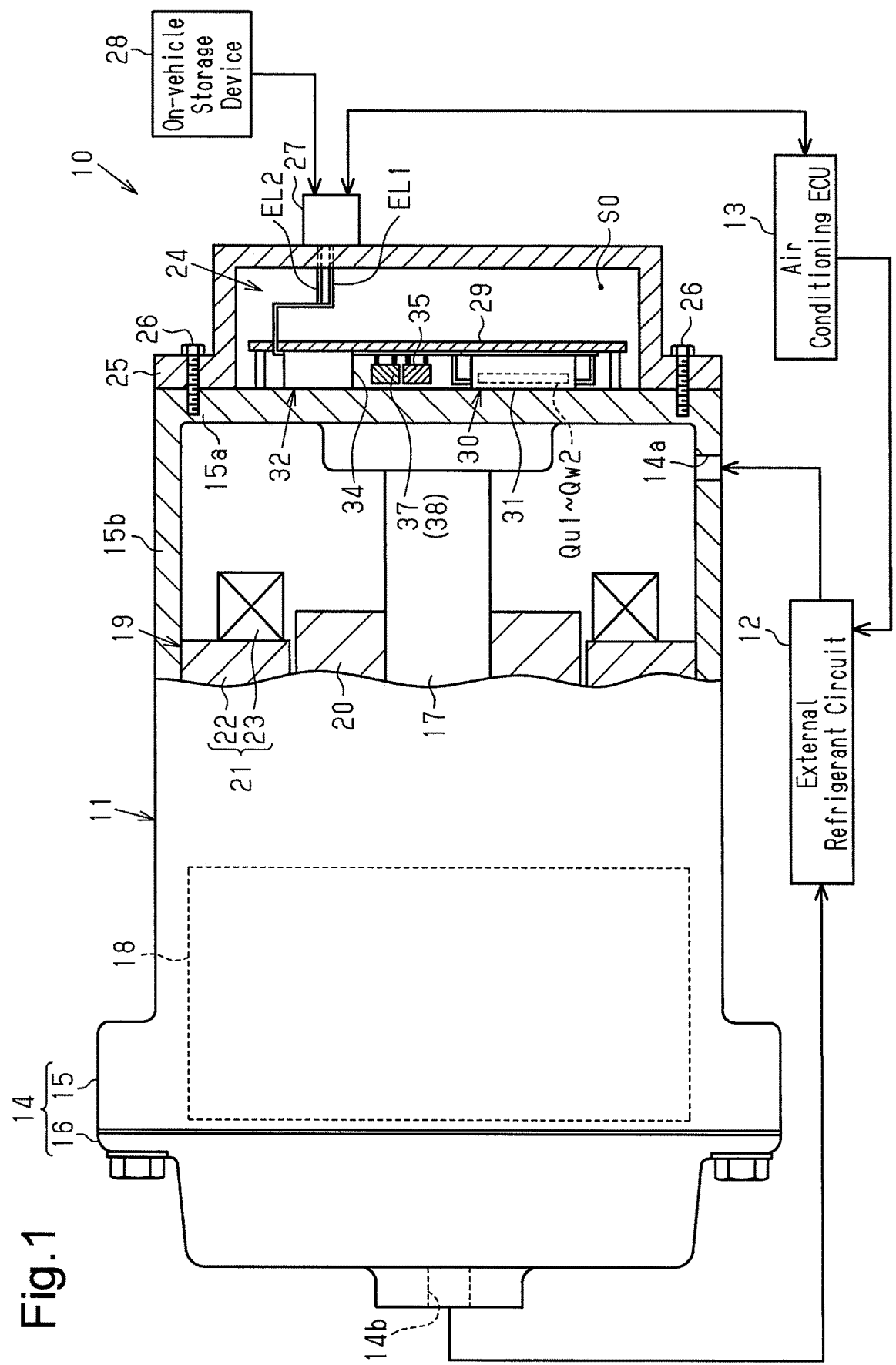
FIG. 1 is a schematic view showing an on-vehicle motor-driven compressor.

As shown in FIG. 1, an on-vehicle air conditioner 10 includes the on-vehicle motor-driven compressor 11 and an external refrigerant circuit 12 that supplies the on-vehicle motor-driven compressor 11 with refrigerant serving as fluid. The external refrigerant circuit 12 includes, for example, a heat exchanger and an expansion valve. The on-vehicle motor-driven compressor 11 compresses refrigerant and the external refrigerant circuit 12 performs heat exchange of the refrigerant and expands the refrigerant. This allows the on-vehicle air conditioner 10 to cool and warm the passenger compartment.

The on-vehicle air conditioner 10 includes an air conditioning ECU 13 that controls the entire on-vehicle air conditioner 10. The air conditioning ECU 13 is configured to obtain, for example, the temperature of the passenger compartment and the preset temperature of the car air conditioner. Based on the parameters, the air conditioning ECU 13 transmits various commands such as an on-off command to the on-vehicle motor-driven compressor 11.

The on-vehicle motor-driven compressor 11 includes a housing 14 having an intake port 14a into which refrigerant is drawn in from the external refrigerant circuit 12.

The housing 14 is made of a thermally conductive material (for example, metal such as aluminum). The housing 14 is grounded to the vehicle body.

The housing 14 includes an intake housing member 15 and a discharge housing member 16 that are coupled to each other. The intake housing member 15 has a tubular shape with one end closed and the other end open. The intake housing member 15 includes a plate-shaped bottom wall 15a and a side wall 15b that extends from the edge of the bottom wall 15a toward the discharge housing member 16. The bottom wall 15a is, for example, substantially plate-shaped, and the side wall 15b is, for example, substantially tubular.

The discharge housing member 16 is coupled to the intake housing member 15 to close the opening of the intake housing member 15. This defines an internal space in the housing 14.

The intake port 14a extends through the side wall 15b of the intake housing member 15. More specifically, the intake port 14a is located at a position in the side wall 15b of the intake housing member 15 closer to the bottom wall 15a than to the discharge housing member 16.

The housing 14 has a discharge port 14b out of which refrigerant is discharged. The discharge port 14b is located at the discharge housing member 16, more specifically, at a part of the discharge housing member 16 opposed to the bottom wall 15a.

The on-vehicle motor-driven compressor 11 includes a rotating shaft 17, the compression unit 18, and an electric motor 19 that are accommodated in the housing 14.

The rotating shaft 17 is rotationally supported by the housing 14. The rotating shaft 17 is arranged with its axial direction coinciding with the thickness direction of the plate-shaped bottom wall 15a (i.e., the axial direction of the tubular side wall 15b). The rotating shaft 17 and the compression unit 18 are coupled to each other.

The compression unit 18 is located in the housing 14 at a position closer to the discharge port 14b than to the intake port 14a (i.e., the bottom wall 15a). Rotation of the rotating shaft 17 causes the compression unit 18 to compress refrigerant that has been drawn into the housing 14 from the intake port 14a and then discharge the compressed refrigerant out of the discharge port 14b. The specific structure of the compression unit 18 may be of any type such as a scroll type, a piston type, or a vane type.

The electric motor 19 is located in the housing 14 between the compression unit 18 and the bottom wall 15a. The electric motor 19 is configured to drive the compression unit 18 by rotating the rotating shaft 17, which is located in the housing 14. The electric motor 19 includes, for example, a cylindrical rotor 20 fixed to the rotating shaft 17 and a stator 21 fixed to the housing 14. The stator 21 includes a cylindrical stator core 22 and coils 23 wound around the teeth of the stator core 22. The rotor 20 and the stator 21 face each other in the radial direction of the rotating shaft 17. When the coils 23 are energized, the rotor 20 and the rotating shaft 17 rotate. This causes the compression unit 18 to compress refrigerant.

As shown in FIG. 1, the on-vehicle motor-driven compressor 11 includes a driver device 24 configured to drive the electric motor 19 and receive direct-current power and a cover 25 that defines an accommodation chamber S0 for accommodating the driver device 24.

The cover 25 is made of a non-magnetic material that is thermally and electrically conductive (for example, metal such as aluminum).

The cover 25 has a tubular shape with one end closed and the other end open toward the housing 14, more specifically, toward the bottom wall 15a of the intake housing member 15. The cover 25 is coupled to the bottom wall 15a of the housing 14 by bolts 26 with the open end in abutment with the bottom wall 15a. The opening of the cover 25 is closed by the bottom wall 15a. The accommodation chamber S0 is defined by the cover 25 and the bottom wall 15a.

The accommodation chamber S0 is located outside the housing 14 and located on the opposite side of the bottom wall 15a from the electric motor 19. The compression unit 18, the electric motor 19, and the driver device 24 are arranged in the axial direction of the rotating shaft 17.

The cover 25 includes a connector 27 to which the driver device 24 is electrically connected. The connector 27 allows the driver device 24 to receive direct-current power from an on-vehicle power storage device 28, which is installed in the vehicle, and electrically connects the air conditioning ECU 13 and the driver device 24 to each other. The on-vehicle power storage device 28 is a direct-current power source installed in the vehicle and is, for example, a rechargeable battery or a capacitor.

As shown in FIG. 1, the driver device 24 includes a circuit board 29, an inverter device 30 provided on the circuit board 29, and two connection lines EL1 and EL2 used to electrically connect the connector 27 and the inverter device 30 to each other.

The circuit board 29 has a plate shape. The circuit board 29 is opposed to the bottom wall 15a and spaced apart from the bottom wall 15a by a predetermined distance in the axial direction of the rotating shaft 17.

The inverter device 30 is configured to drive the electric motor 19. The inverter device 30 includes an inverter circuit 31 (refer to FIG. 2) and a noise reducer 32 (refer to FIG. 2). The inverter circuit 31 is configured to convert direct-current power into alternating-current power. The noise reducer 32 is located on the input side of the inverter circuit 31 and is configured to reduce common-mode noise and normal-mode noise contained in the direct-current power before being input to the inverter circuit 31.

The electrical configuration of the electric motor 19 and the driver device 24 will now be described.

Figure 2:
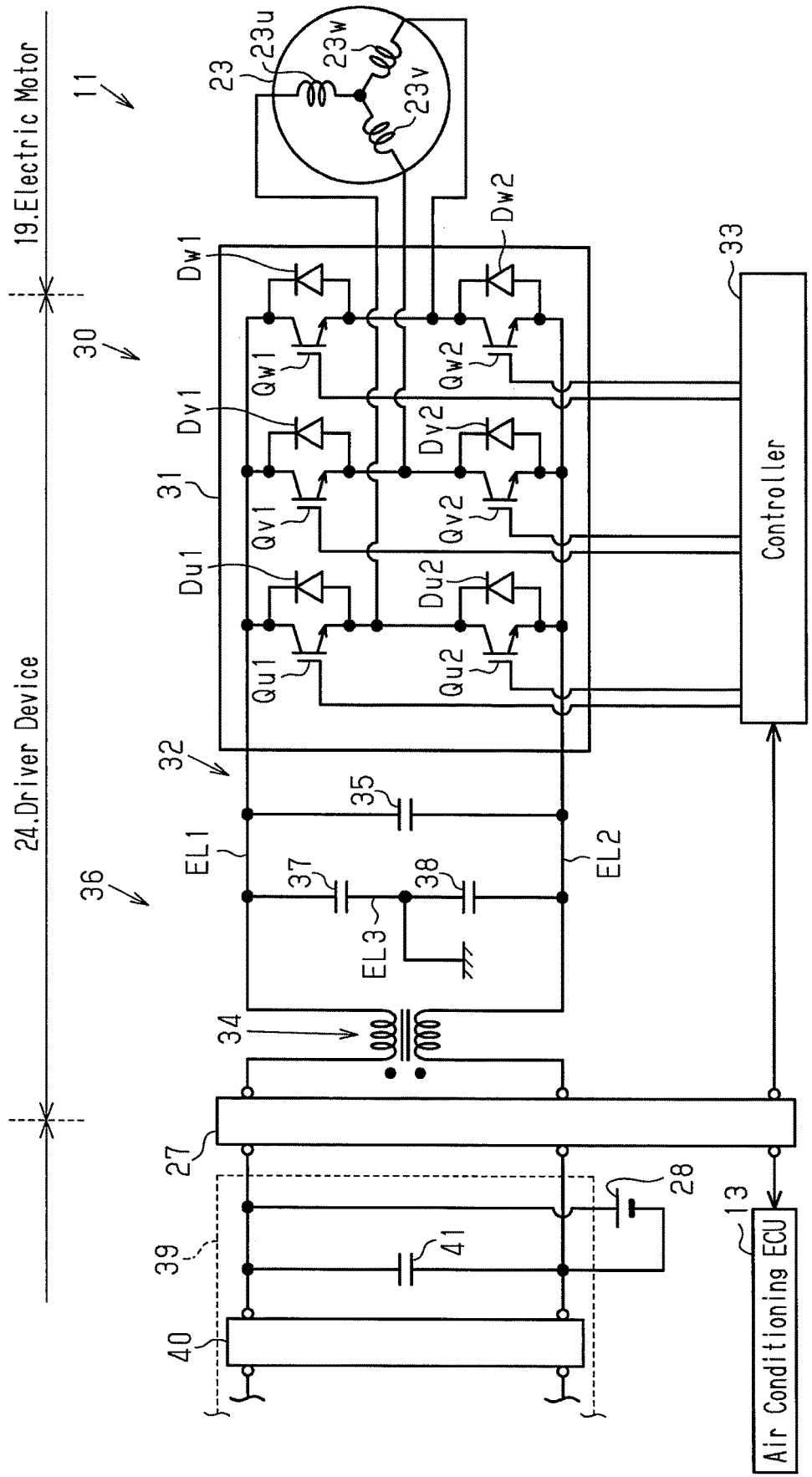
FIG. 2 is a circuit diagram showing a driver device and an electric motor.

As shown in FIG. 2, the coils 23 of the electric motor 19 are of a three-phase structure with, for example, a u-phase coil 23u, a v-phase coil 23v, and a w-phase coil 23w. The coils 23u to 23w are connected in a Y-connection.

The inverter circuit 31 includes u-phase switching elements Qu1 and Qu2 corresponding to the u-phase coil 23u, v-phase switching elements Qv1 and Qv2 corresponding to the v-phase coil 23v, and w-phase switching elements Qw1 and Qw2 corresponding to the w-phase coil 23w. Each of the switching elements Qu1 to Qw2 is, for example, a power switching element such as an insulated gate bipolar transistor (IGBT). The switching elements Qu1 to Qw2 are respectively connected to flyback diodes Du1 to Dw2 (body diodes).

The u-phase switching elements Qu1 and Qu2 are connected in series by a connection wire that is connected to the u-phase coil 23u. The serial connector formed by the u-phase switching elements Qu1 and Qu2 is electrically connected to the two connection lines EL1 and EL2 and receives direct-current power from the on-vehicle power storage device 28.

Although the corresponding coils are different, the remaining power switching elements Qv1, Qv2, Qw1, and Qw2 are connected in the same manner as the u-phase power switching elements Qu1 and Qu2.

The driver device 24 includes a controller 33 that controls the switching operation of the switching elements Qu1 to Qw2. The controller 33 is implemented by, for example, at least one dedicated hardware circuit and/or at least one processor (control circuit) that operates in accordance with computer programs (software). The processor includes a CPU and memories such as a RAM and a ROM. The memories store, for example, program codes or commands configured to cause the processor to execute various processes. The memory, or computer readable storage medium, includes any type of storage medium that is accessible by general-purpose computers and dedicated computers.

The controller 33 is electrically connected to the air conditioning ECU 13 by the connector 27. Based on the commands from the air conditioning ECU 13, the controller 33 cyclically turns the switching elements Qu1 to Qw2 on and off. In detail, the controller 33 performs a pulse width modulation control (PWM control) on the switching elements Qu1 to Qw2 based on the commands from the air conditioning ECU 13. In more detail, the controller 33 uses a carrier signal and a commanded voltage value signal (signal for comparison) to generate a control signal. The controller 33 uses the generated control signal to perform an on-off control on the switching elements Qu1 to Qw2, thereby converting the direct-current power into alternating-current power.

The noise reducer 32 includes a common-mode choke coil 34 and an X capacitor 35. The common-mode choke coil 34 and the X capacitor 35, which serves as a smoothing capacitor, configure a low-pass filter circuit 36. The low-pass filter circuit 36 is located on the connection lines EL1 and EL2. The low-pass filter circuit 36 is located between the connector 27 and the inverter circuit 31 in the circuitry.

The common-mode choke coil 34 is located on the connection lines EL1 and EL2.

The X capacitor 35 is located on the downstream side of the common-mode choke coil 34 (i.e., located closer to the inverter circuit 31). That is, the X capacitor 35 is located between the common-mode choke coil 34 and the inverter circuit 31. The X capacitor 35 is electrically connected to the connection lines EL1 and EL2. The common-mode choke coil 34 and the X capacitor 35 configure an LC resonant circuit. That is, the low-pass filter circuit 36 of the first embodiment is an LC resonant circuit including the common-mode choke coil 34.

Two Y capacitors 37 and 38, namely, a first Y capacitor 37 and a second Y capacitor 38, are connected in series. More specifically, the driver device 24 includes a bypass line EL3 that connects a first end of the first Y capacitor 37 and a first end of the second Y capacitor 38 to each other. The bypass line EL3 is grounded to the vehicle body.

The serially-connected body of the Y capacitors 37 and 38 is provided between the common-mode choke coil 34 and the X capacitor 35 and electrically connected to the common-mode choke coil 34. A second end of the first Y capacitor 37 on the side opposite to the first end is connected to the first connection line EL1, more specifically, to a portion of the first connection line EL1 that connects a first winding 70 of the common-mode choke coil 34 and the inverter circuit 31 to each other. A second end of the second Y capacitor 38 on the side opposite to the first end is connected to the second connection line EL2, more specifically, to a portion of the second connection line EL2 that connects a second winding 71 of the common-mode choke coil 34 and the inverter circuit 31 to each other.

The on-vehicle devices of the vehicle include, for example, a power control unit 39 (PCU) provided separately from the driver device 24. The PCU 39 uses the direct-current power supplied from the on-vehicle power storage device 28 to drive the traveling motor installed in the vehicle. That is, in the first embodiment, the PCU 39 and the driver device 24 are connected in parallel to the on-vehicle power storage device 28, and the on-vehicle power storage device 28 is shared by the PCU 39 and the driver device 24.

The PCU 39 includes a boost converter 40 and a power supply capacitor 41. The boost converter 40 includes a boost switching element. The boost converter 40 cyclically turns the boost switching element on and off to boost the direct-current power of the on-vehicle power storage device 28.

That is, the power supply capacitor 41 is connected in parallel to the on-vehicle power storage device 28. Although not illustrated, the PCU 39 includes a traveling inverter that converts the direct-current power boosted by the boost converter 40 into drive power with which the traveling motor can be driven.

In the above-described configuration, the noise generated by switching the boost switching element flows into the driver device 24 as normal-mode noise. In other words, the normal-mode noise contains a noise component corresponding to the switching frequency of the boost switching element.

The configuration of the common-mode choke coil 34 will now be described with reference to FIGS. 3A to 3C, 4, 5A to 5C, and 6A to 6C.

The common-mode choke coil 34 is configured to limit transmission of high-frequency noise generated in the PCU 39, which is located on the vehicle side, to the inverter circuit 31, which is on the compressor side. In particular, the common-mode choke coil 34 is used as an L component in the low-pass filter circuit (LC filter) 36 that eliminates normal-mode noise (differential-mode noise) by utilizing the leakage inductance as a normal inductance. That is, the common-mode choke coil 34 can be used to cope with common-mode noise and normal-mode noise (differential-mode noise). Both mode noises can be coped with by a single choke coil, not by the common-mode choke coil and the normal-mode (differential-mode) choke coil respectively.

In the drawings, a three-axis orthogonal coordinate system is defined such that the axial direction of the rotating shaft 17 in FIG. 1 is referred to as the "Z direction," and the directions orthogonal to the Z direction are referred to as the "X direction" and "Y direction."

As shown in FIGS. 3A to 3C, the common-mode choke coil 34 includes a case 50, a core 60, the first winding 70, the second winding 71, and a metal plate 80, which serves as a belt-shaped plate made of a conductor. The common-mode choke coil 34 is used with the first winding 70 and the second winding 71 wound around the case 50, which accommodates the core 60, and with the metal plate 80 spaced apart from and wound around the first winding 70 and the second winding 71. The first winding 70 and the second winding 71 are arranged to be opposed to each other with the axis of the core 60 between the first winding 70 and the second winding 71.

Figure 6B:
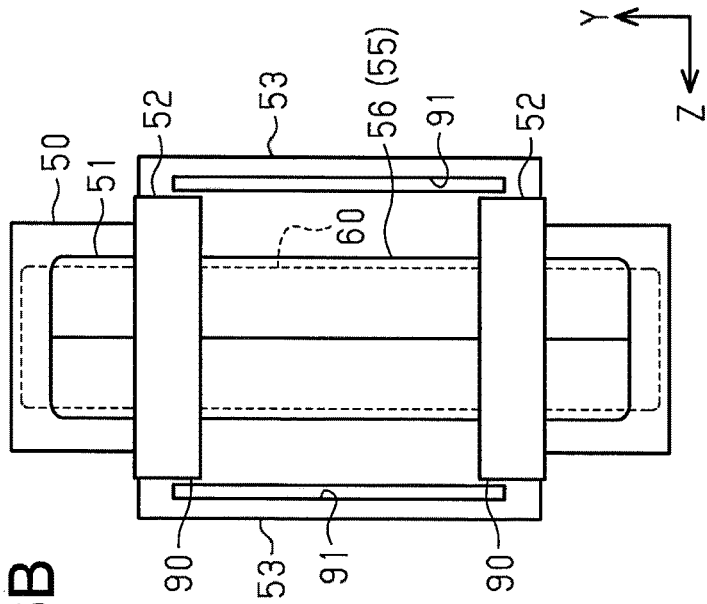
FIG. 6B is a right side view of the case and the core.
Figure 6A:
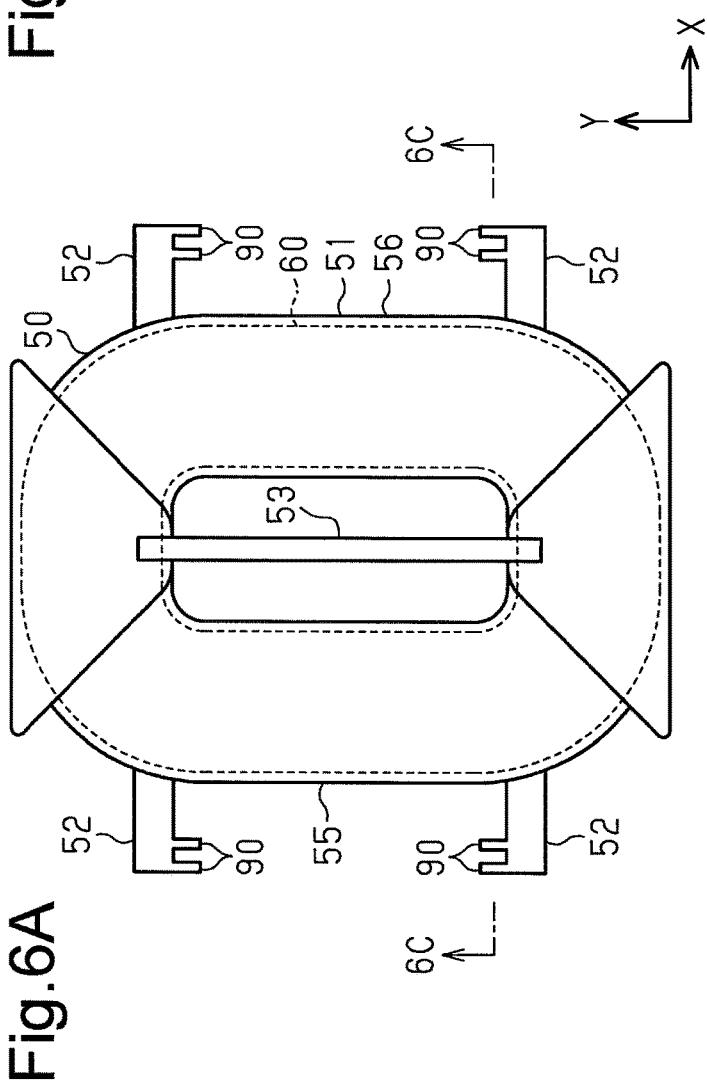
FIG. 6A is a plan view of the case and the core.
Figure 6C:
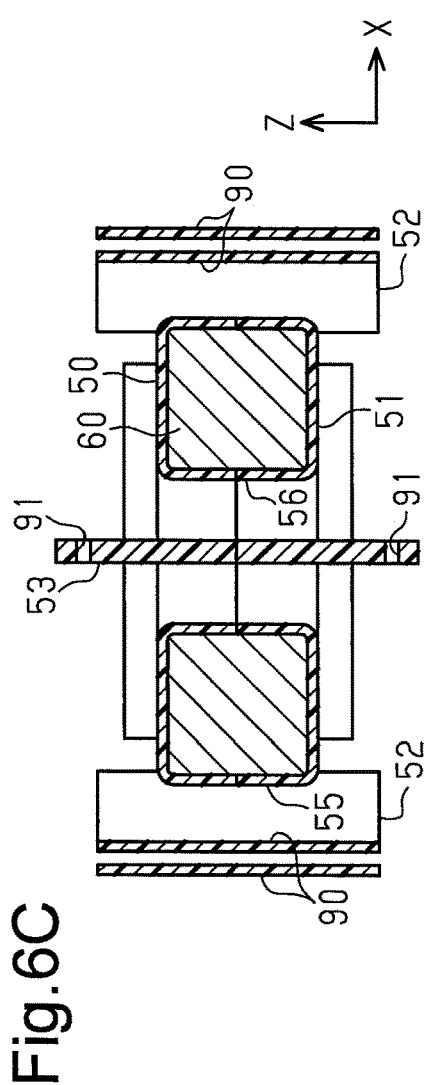
FIG. 6C is a cross-sectional view taken along line 6C-6C in FIG. 6A.

As shown in FIGS. 6A to 6C, the core 60 is accommodated in the case 50. The core 60 has a quadrangular cross section as shown in FIG. 6C, and entirely has the shape of a substantially rectangular loop in the X-Y plane shown in FIG. 6A.

Figure 4:
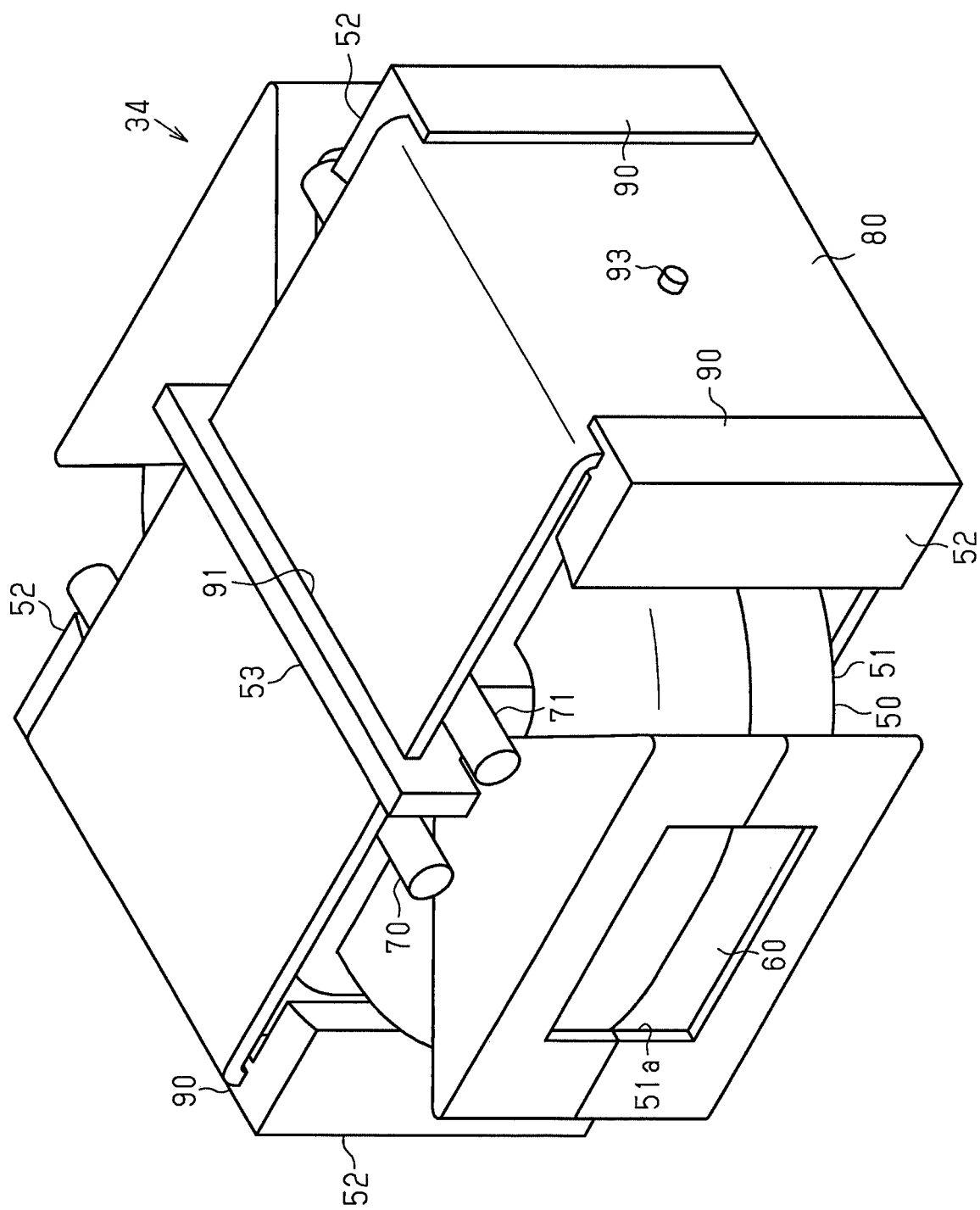
FIG. 4 is a perspective view of the common-mode choke coil.

As shown in FIGS. 6A to 6C, the case 50 has the shape of a loop. Further, the case 50 is made of a plastic and electrically insulated. The case 50 includes a body 51, four protrusions 52, and a wall 53. The body 51 covers the entire core 60 except for an opening 51a (refer to FIG. 4). As shown in FIGS. 5A to 6C, the first winding 70 and the second winding 71 are wound around the body 51. As shown in FIG. 4, the opening 51a is located between the first winding 70 and the second winding 71, and the opening 51a causes part of the core 60 between the first winding 70 and the second winding 71 to be exposed to the outside.

As shown in FIGS. 6A to 6C, the protrusions 52 protrude from the outer circumferential surface of the body 51 in the radial direction of the core 60. More specifically, the four protrusions 52 protrude outward (in the X-direction) from the body 51 in FIG. 6A. A first pair of the protrusions 52 opposed to each other in the Y-direction is located at one end of the metal plate 80 in the width direction. A second pair of the protrusions 52, which are spaced apart from the first pair of the protrusions 52 in the X-direction and are opposed to each other in the Y-direction, is located at the other end of the metal plate 80 in the width direction. As shown in FIG. 6C, each protrusion 52 extends in the Z-direction. As shown in FIGS. 5A to 5C, the four protrusions 52 cause the first winding 70 and the second winding 71 to be divided from each other.

The wall 53 is located on the inner side of the core 60 and extends in the Z-direction between the first winding 70 and the second winding 71. The wall 53 causes the first winding 70 and the second winding 71 to be divided from each other.

As shown in FIGS. 5A to 5C, the first winding 70 is wound around the outer surface of the case 50, and the second winding 71 is wound around the outer surface of the case 50. More specifically, as shown in FIGS. 6A to 6C, the case 50 includes a first straight portion 55 and a second straight portion 56 that extend straight in parallel to each other. As shown in FIGS. 5A to 5C, at least part of the first winding 70 is wound around the first straight portion 55, and at least part of the second winding 71 is wound around the second straight portion 56. The winding directions of the first winding 70 and the second winding 71 are opposite to each other. Further, the first winding 70 and the second winding 71 are spaced apart from and opposed to each other.

As shown in FIGS. 3A to 3C and 4, the metal plate 80, which is made of a conductor, is belt-shaped and endless. For example, a copper plate may be used for the metal plate 80. The metal plate 80 covers the core 60 and the case 50 while extending over the first winding 70 and the second winding 71. Parts of the metal plate 80 opposed to each other between the first winding 70 and the second winding 71 are spaced apart from each other.

As shown in FIGS. 6A to 6C, each protrusion 52 of the case 50 includes two projections 90 at the distal end of the protrusion 52. The two projections 90 project from the outer surface of the body 51. The two projections 90 are formed into a substantially U-shape in a cross-sectional view. That is, the two projections 90 configure a channel. As shown in FIGS. 3A to 3C and 4, the metal plate 80 is held by the two projections 90 such that the metal plate 80 is spaced apart from the first winding 70 and the second winding 71. The two projections 90 configure the channel extending along a portion of the metal plate 80, and the portion of the metal plate 80 is inserted into the channel. When manufacturing the common-mode choke coil 34, the metal plate 80 is wound around the two projections 90 (U-shaped portions) while being inserted into the two projections 90. The two projections 90 (U-shaped portions) on each protrusion 52, which position the first winding 70 and the second winding 71, prevent displacement of the metal plate 80 in the vertical direction (Z-direction) and in the left-right direction (X-direction) and stabilize the gap (clearance) between the first and second windings 70 and 71 and the metal plate 80. More specifically, as shown in FIG. 3C, when the size of the clearance in the Z-direction is referred to as Ga1 and the size of the clearance in the X-direction is referred to as Ga2, the narrower the gap (sizes Ga1 and Ga2 of the clearances), the better the shielding characteristics (phase characteristics) becomes. The gap is stabilized to keep the shielding characteristics fixed.

As shown in FIGS. 6B and 6C, the wall 53 of the case 50 has through-holes 91. As shown in FIGS. 3B and 3C, the metal plate 80 is inserted through the through-holes 91, and the metal plate 80 is positioned by the through-holes 91. That is, the wall 53, which insulates the first winding 70 and the second winding 71, has the through-holes 91 (slits) at the upper portion and the lower portion (one end and the other end in the Z-direction), and the metal plate 80 is inserted through the through-holes 91 (slits) to stabilize the gap.

As shown in FIGS. 5A to 5C, spacers 92 are fixed to the outer circumferential surfaces of the first winding 70 and the second winding 71. As shown in FIGS. 3B and 3C, the metal plate 80 is positioned by the spacers 92. That is, the arrangement of the spacers 92 on the outer circumferential surfaces of the first winding 70 and the second winding 71 prevents displacement of the metal plate 80 in the X-direction and stabilizes the gap.

As shown in FIGS. 5A to 5C, a round pin 93 is fixed to the outer circumferential surfaces of the first winding 70 and the second winding 71 such that the round pin 93 extends outward in the radial direction (X-direction). As shown in FIGS. 3B and 3C, the round pin 93 extends through the metal plate 80. The metal plate 80 is positioned by the round pin 93. In this manner, the round pin 93, which is used for fitting, is arranged on the outer circumferential surfaces of the first winding 70 and the second winding 71, and the round pin 93 is fitted into the through-holes for positioning the metal plate 80, thereby stabilizing the gap. That is, since the round pin 93, which is used for displacement prevention, extends through the metal plate 80, displacement of the metal plate 80 is prevented.

The operation of the embodiment will now be described.

First, the normal mode (differential mode) will be described with reference to FIGS. 7A and 7B.

Figure 7A:
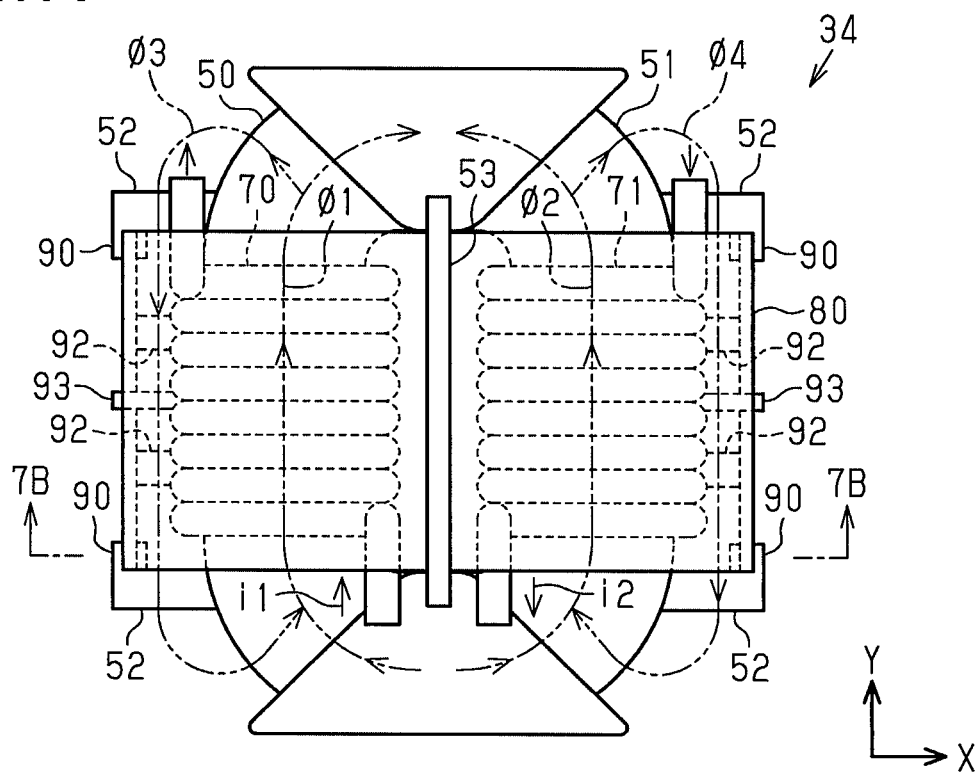
FIG. 7A is a plan view of the common-mode choke coil, illustrating the operation of the common-mode choke coil.
Figure 7B:
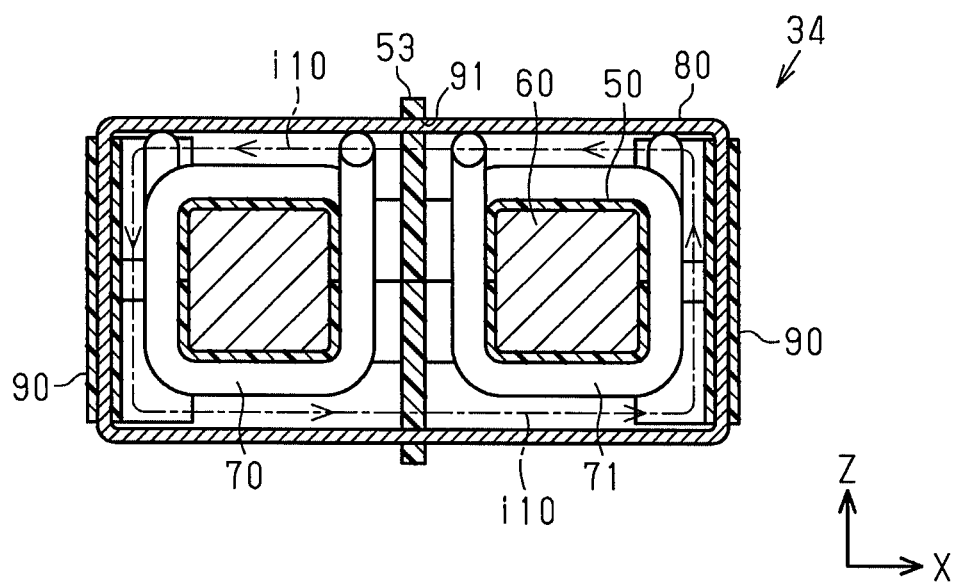
FIG. 7B is a cross-sectional view taken along line 7B-7B in FIG. 7A.

As shown in FIG. 7A, when the first winding 70 and the second winding 71 are energized, currents i1 and i2 flow. This generates magnetic fluxes $\varphi 1$ and $\varphi 2$ in the core 60 and leakage magnetic fluxes $\varphi 3$ and $\varphi 4$. As shown in FIG. 7B, an induced current i10 flows in the circumferential direction inside the metal plate 80 so as to generate magnetic fluxes in a direction resisting the generated leakage magnetic fluxes $\varphi 3$ and $\varphi 4$.

In this manner, the induced current (eddy current) i10 flows in the circumferential direction inside the metal plate 80 so as to generate magnetic fluxes in the direction resisting the leakage magnetic fluxes generated when the first winding 70 and the second winding 71 are energized. The induced current flowing in the circumferential direction refers to the induced current flowing around the core 60.

In the common mode, when the first winding 70 and the second winding 71 are energized, currents flow in the same direction. This generates magnetic fluxes in the same direction in the core 60. In this manner, when current is supplied in the common mode, magnetic fluxes are generated and almost no leakage magnetic flux is generated in the core 60. This maintains the common impedance.

The frequency characteristics of the low-pass filter circuit 36 will now be described.

When the common-mode choke coil 34 does not include the metal plate 80 made of a conductor, the Q factor of the low-pass filter circuit 36 (more specifically, the LC resonant circuit including the common-mode choke coil 34 and the X capacitor 35) is high as indicated by the long dashed short dashed line in FIG. 7. Therefore, the normal-mode noise of a frequency close to the resonant frequency of the low-pass filter circuit 36 cannot be easily reduced.

In the first embodiment, the common-mode choke coil 34 includes the metal plate 80 made of a conductor at a position where eddy currents are generated by the line of magnetic force (leak magnetic fluxes $\varphi 3$ and $\varphi 4$) generated in the common-mode choke coil 34. The metal plate 80 made of a conductor is located at a position through which the leakage magnetic fluxes φ3 and φ4 extend. The metal plate 80 is configured such that the leakage magnetic fluxes φ3 and φ4 generate an induced current (eddy current) that generates magnetic fluxes in a direction cancelling the leakage magnetic fluxes φ3 and φ4. As a result, the metal plate 80 made of a conductor lowers the Q factor of the low-pass filter circuit 36. Thus, the Q factor of the low-pass filter circuit 36 is low. Therefore, the normal-mode noise having a frequency near the resonant frequency of the low-pass filter circuit 36 is also reduced by the low-pass filter circuit 36.

As described above, the employment of a metal shielding structure with the band-shaped, endless metal plate 80 in the common-mode choke coil allows for the use of the low-pass filter circuit as the common-mode choke coil, thereby reducing the common mode noise. Also, the leakage magnetic fluxes generated relative to normal-mode current (differential-mode current) are fully utilized to obtain suitable filtering characteristics that involve the reduction of normal-mode noise (differential-mode noise). That is, the use of the band-shaped, endless metal plate 80 generates magnetic fluxes resisting the leakage magnetic fluxes generated when normal-mode current (differential-mode current) is supplied, and electromagnetic induction is performed to cause the current to flow in the metal plate 80 and to be consumed as heat. Since the metal plate 80 acts as a magnetic resistance, a damping effect is obtained and the resonance peak generated by the low-pass filter circuit is reduced. Further, when current is supplied in the common mode, magnetic fluxes are generated but almost no leakage magnetic flux is generated in the core. This maintains the common impedance.

Furthermore, in the shielding structure using the metal plate 80, the gap (clearance) between the first winding 70 and the second windings 71 affects the shielding characteristics (phase characteristics). Thus, the two projections 90, the through-holes 91 (slits), the spacers 92, and the round pin 93 are arranged on the case 50 to keep the sizes Ga1 and Ga2 of the clearances fixed. This reduces the manufacturing irregularity.

The above-described embodiment has the following advantages.

(1) The on-vehicle motor-driven compressor 11 includes the inverter device 30, which drives the electric motor 19. The inverter device 30 includes the inverter circuit 31 and the noise reducer 32. The noise reducer 32 includes the common-mode choke coil 34 and the X capacitor 35, which serves as a smoothing capacitor. The common-mode choke coil 34 and the X capacitor 35 configure the low-pass filter circuit 36. The common-mode choke coil 34 includes the loop-shaped case 50, the loop-shaped core 60, the first winding 70, the second winding 71, and the metal plate 80. The case 50 is made of a plastic. The core 60 is accommodated in the case 50. The first winding 70 is wound around the outer surface of the case 50. The second winding 71 is wound around the outer surface of the case 50, and spaced apart from and opposed to the first winding 70. The metal plate 80 serves as a loop-shaped conductor covering the core 60 and the case 50 while extending over the first winding 70 and the second winding 71. The parts of the metal plate 80 opposed to each other between the first winding 70 and the second winding 71 are spaced apart from each other. The case 50 includes the two projections 90, which project from the outer surface. The metal plate 80 is held by the two projections 90 such that the metal plate 80 is spaced apart from the first winding 70 and the second winding 71.

Thus, in the common-mode choke coil, the metal plate 80 covers the core 60 and the case 50 while extending over the first winding 70 and the second winding 71, and the two projections 90, which project from the outer surface of the case 50, cause the metal plate 80 to be spaced apart from the first winding 70 and the second winding 71. This stabilizes the characteristics of the filter circuit.

(2) The case 50 includes the first straight portion 55, around which at least part of the first winding 70 is wound, and the second straight portion 56, around which at least part of the second winding 71 is wound. The first straight portion 55 and the second straight portion 56 extend straight in parallel to each other. Thus, the metal plate 80, which serves a belt-shaped plate made of a conductor, can be easily arranged. This is of practical use.

It should be apparent to those skilled in the art that the present disclosure may be embodied in many other specific forms without departing from the spirit or scope of the disclosure. Particularly, it should be understood that the present disclosure may be embodied in the following forms.

The metal plate 80 does not have to be made of a copper plate. Instead, the metal plate 80 may be made of, for example, an aluminum plate, a brass plate, or a stainless steel plate. Further, the material is not limited to a non-magnetic metal such as copper but may be a magnetic metal. However, when a magnetic metal such as iron is used for the metal plate 80, the flow of an induced current generates further magnetic fluxes. Since this may adversely affect the metal plate 80, it is preferred that a non-magnetic metal be used.

Therefore, the present examples and embodiments are to be considered as illustrative and not restrictive and the disclosure is not to be limited to the examples and embodiments given herein.

The invention claimed is:

1. An on-vehicle motor-driven compressor comprising:
a compression unit configured to compress fluid;
an electric motor configured to drive the compression unit; and
an inverter device configured to drive the electric motor, wherein
the inverter device includes
an inverter circuit configured to convert direct-current power into alternating-current power, and
a noise reducer arranged on an input side of the inverter circuit, wherein the noise reducer is configured to reduce common-mode noise and normal-mode noise contained in the direct-current power before being input to the inverter circuit,
the noise reducer includes
a common-mode choke coil, and
a smoothing capacitor, wherein the common-mode choke coil and the smoothing capacitor configure a low-pass filter circuit,
the common-mode choke coil includes
a loop-shaped case made of a plastic,
a loop-shaped core accommodated in the loop-shaped case,
a first winding wound around an outer surface of the loop-shaped case,
a second winding wound around the outer surface of the loop-shaped case, wherein the second winding is spaced apart from and opposed to the first winding, and
a loop-shaped conductor that covers the loop-shaped core and the loop-shaped case while extending over the first winding and the second winding, parts of the loop-shaped conductor that are opposed to each other between the first winding and the second winding are spaced apart from each other, the loop-shaped case includes two projections that project from the outer surface of the loop-shaped case, and the loop-shaped conductor is held by the two projections such that the loop-shaped conductor is spaced apart from the first winding and the second winding.

2. The on-vehicle motor-driven compressor according to claim 1, wherein the loop-shaped case includes a first straight portion around which at least part of the first winding is wound and a second straight portion around which at least part of the second winding is wound, and the first straight portion and the second straight portion extend straight in parallel to each other.

3. The on-vehicle motor-driven compressor according to claim 1, wherein the two projections configure a channel extending along a portion of the loop-shaped conductor, and the portion of the loop-shaped conductor is inserted into the channel.

* * * * *